(12) United States Patent
Krajewski et al.

(10) Patent No.: US 11,617,438 B2
(45) Date of Patent: Apr. 4, 2023

(54) INFLATABLE DELIVERY CABINET

(71) Applicant: GM GLOBAL TECHNOLOGY OPERATIONS LLC, Detroit, MI (US)

(72) Inventors: Paul E. Krajewski, Troy, MI (US); Wonhee M. Kim, Royal Oak, MI (US); Paul W. Alexander, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 16/940,541

(22) Filed: Jul. 28, 2020

(65) Prior Publication Data
US 2022/0031069 A1 Feb. 3, 2022

(51) Int. Cl.
| A47B 81/00 | (2006.01) |
| A47B 31/02 | (2006.01) |
| A47B 31/04 | (2006.01) |
| A47F 3/04 | (2006.01) |

(52) U.S. Cl.
CPC .............. *A47B 81/00* (2013.01); *A47B 31/02* (2013.01); *A47B 31/04* (2013.01); *A47F 3/0443* (2013.01)

(58) Field of Classification Search
CPC ......... A47B 81/00; A47B 31/02; A47B 31/04; A47F 3/0443; B63B 32/51
USPC ......................................... 108/162; 312/3–6
See application file for complete search history.

(56) References Cited

U.S. PATENT DOCUMENTS

| 4,044,867 A * | 8/1977 | Fisher | A45C 7/004 383/3 |
| 4,573,202 A * | 2/1986 | Lee | A45C 13/021 190/125 |
| 4,809,352 A * | 2/1989 | Walker | A45C 7/0081 383/3 |
| 5,080,701 A * | 1/1992 | Howard | B08B 15/026 134/201 |
| 5,454,471 A * | 10/1995 | Norvell | B32B 5/22 126/400 |
| 5,624,035 A * | 4/1997 | Kim | B65D 81/052 206/592 |
| 6,222,160 B1 * | 4/2001 | Remke | A47J 47/14 219/528 |
| 6,260,306 B1 * | 7/2001 | Swetish | E04H 15/20 135/96 |
| 6,383,242 B1 * | 5/2002 | Rogers | B01D 46/42 52/63 |
| 6,392,201 B1 * | 5/2002 | Owens | A47J 47/145 219/387 |
| 7,034,254 B2 * | 4/2006 | Grabowski | F24C 7/10 219/544 |

(Continued)

OTHER PUBLICATIONS

U.S. Appl. No. 16/178,040, filed Oct. 31, 2019, Alexander et al.
U.S. Appl. No. 16/669,827, filed Nov. 1, 2018, Chae et al.

*Primary Examiner* — Daniel J Troy
*Assistant Examiner* — Timothy M Ayres

(57) ABSTRACT

An inflatable cabinet is provided and includes a first inflatable cabinet stand and a base. The first inflatable cabinet stand is for storing products. The first inflatable cabinet stand includes members and first connectors. The members include side walls, a back wall, and a top member. The base is connected to the first inflatable cabinet stand and includes an air pump, second connectors and air lines. An air pump is configured to pump air into at least one of the members of the first inflatable cabinet stand. The second connectors are configured to connect to the first connectors. The air lines are connected between the air pump and the second connectors.

20 Claims, 11 Drawing Sheets

(56) References Cited

U.S. PATENT DOCUMENTS

| | | | | |
|---|---|---|---|---|
| 7,491,912 | B1* | 2/2009 | Check | F24C 7/10 |
| | | | | 219/385 |
| 9,357,824 | B2* | 6/2016 | McDonald | A47C 17/82 |
| 9,617,753 | B2* | 4/2017 | Day | E04H 15/20 |
| 9,854,886 | B1* | 1/2018 | Xia | A45C 13/103 |
| 9,930,997 | B2* | 4/2018 | Larpenteur | A47J 47/14 |
| 10,081,490 | B2* | 9/2018 | Schaftenaar | B65G 1/023 |
| 10,473,384 | B2* | 11/2019 | Stollenwerck, III | F25D 23/069 |
| 10,799,002 | B2* | 10/2020 | Bradley | A45C 13/36 |
| 11,117,524 | B2* | 9/2021 | Prade | B60R 7/00 |
| 2007/0023439 | A1* | 2/2007 | Vaughn | F25D 3/08 |
| | | | | 220/592.2 |
| 2012/0085608 | A1* | 4/2012 | Huang | A45C 13/021 |
| | | | | 190/124 |
| 2021/0024276 | A1* | 1/2021 | Bradley | A45C 13/36 |
| 2022/0090407 | A1* | 3/2022 | Watts | E04H 15/06 |
| 2022/0212858 | A1* | 7/2022 | Krajewski | A45C 11/20 |

* cited by examiner

INFLATABLE DELIVERY CABINET

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to delivery cabinets.

Delivery cabinets are used for transporting goods. As an example, multiple delivery cabinets can be filled with goods, rolled onto a delivery truck and transported from a product provider to customers. The delivery cabinets may be used to transport food and/or other goods. The cabinets may be insulated to maintain temperatures of products for an extended period of time.

SUMMARY

An inflatable cabinet is provided and includes a first inflatable cabinet stand and a base. The first inflatable cabinet stand is for storing products. The first inflatable cabinet stand includes members and first connectors. The members include side walls, a back wall, and a top member. The base is connected to the first inflatable cabinet stand and includes an air pump, second connectors and air lines. An air pump is configured to pump air into at least one of the members of the first inflatable cabinet stand. The second connectors are configured to connect to the first connectors. The air lines are connected between the air pump and the second connectors.

In other features, one or more of the members includes guide vanes for directing air flow across and through the one or more of the members.

In other features, one or more of the members has a multi-layer tethered structure.

In other features, the multi-layer tethered structure includes: fabric layers with weaved strands extending between the fabric layers; and an outer air tight shell encapsulating the fabric layers.

In other features, the inflatable cabinet further includes a bond layer disposed between the fabric layers and the outer air tight shell.

In other features, one or more of the members includes a heating element embedded in the one or more of the members.

In other features, the first inflatable cabinet stand is interchangeable with a second inflatable cabinet stand and has a different configuration than the first inflatable cabinet stand.

In other features, the first inflatable cabinet stand at least one of has: a different number of shelves than the second inflatable cabinet stand; or a different height than the second inflatable cabinet stand.

In other features, the first inflatable cabinet stand includes attachment elements for attaching the first inflatable cabinet stand to the base. The first inflatable cabinet stand is removable from the base and deflatable and stackable with other deflated cabinet stands.

In other features, the first inflatable cabinet stand has shelves that are able to be attached to the side walls in different locations.

In other features, the first inflatable cabinet stand includes a flexible door.

In other features, the first inflatable cabinet stand includes an inflatable door.

In other features, the base includes a control module. The control module is configured to control flow and temperature of air supplied to the at least one of the members.

In other features, the inflatable cabinet further includes a sensor configured to detect a temperature in the at least one of the members. The control module is configured to control flow and temperature of air supplied to the at least one of the members based on the temperature detected by the sensor.

In other features, the inflatable cabinet further includes a sensor configured to detect a pressure of air in the at least one of the members. The control module is configured to control flow of air supplied to the at least one of the members based on the pressure detected by the sensor.

In other features, a method of operating an inflatable cabinet system of an inflatable cabinet is provided. The method includes: receiving a first indication to inflate an inflatable cabinet stand of the inflatable cabinet; determining whether pressure in at least one of a members of the inflatable cabinet stand is greater than or equal to a predetermined pressure; activating a pump to inflate the at least one of the members when the pressure is greater than or equal to the predetermined pressure; receiving a second indication to operate in one of a heating mode, a cooling mode or an ambient temperature mode; determining based on the second indication whether to operate in the heating mode, the cooling mode or the ambient temperature mode; activating at least one of an air heating device or a heating element when operating in the heating mode to heat air in the at least one of the members; activating an air cooling device and pumping cooled air to the at least one of the members when operating in the cooling mode; and directly supplying air to the at least one of the members without heating or cooling the air when operating in the ambient temperature mode.

In other features, the method further includes pumping heated air to the cabinet stand when operating in the heating mode.

In other features, the method further includes: monitoring a temperature in the at least one of the members; and based on the temperature, determining whether to heat or cool air supplied into the at least one of the members.

In other features, the method further includes: monitoring a temperature in the cabinet stand where products are able to be stored; and based on the temperature, determining whether to heat or cool air supplied into the at least one of the members.

In other features, the method further includes: receiving an indication to deflate the cabinet stand; and activating the pump to pump air out of the cabinet stand.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Conventional delivery cabinets include rigid structures, which are often formed of steel. The delivery cabinets are heavy and have small interiors due to the thick insulated walls, which can include foam insulation and reduce usable interior space. The delivery cabinets are not collapsible and as a result are in a same size state when stowed as when in use. The delivery cabinets cannot be stored in a compacted state.

Examples set forth herein include inflatable delivery cabinets, which may be inflated prior to use and deflated when stowed (or not in use). The inflatable delivery cabinets (hereinafter also referred to as "inflatable cabinets") may be stacked when deflated, which allows for stowing multiple cabinets in a same space as traditional cabinets. The inflatable cabinets include inflatable cabinet stands (hereinafter also referred to as "cabinet stands") that may be interchanged, reconfigured, heated and/or cooled. The cabinet stands include internally tethered members (e.g., walls, shelves, doors, and/or top members) for rigidity that can be deflated and stowed. The members of the cabinet stands may be internally heated and/or cooled by circulating heated or cooled air through the members. The members may also or alternatively be internally heated via electrodes embedded in the members.

Figure 1:
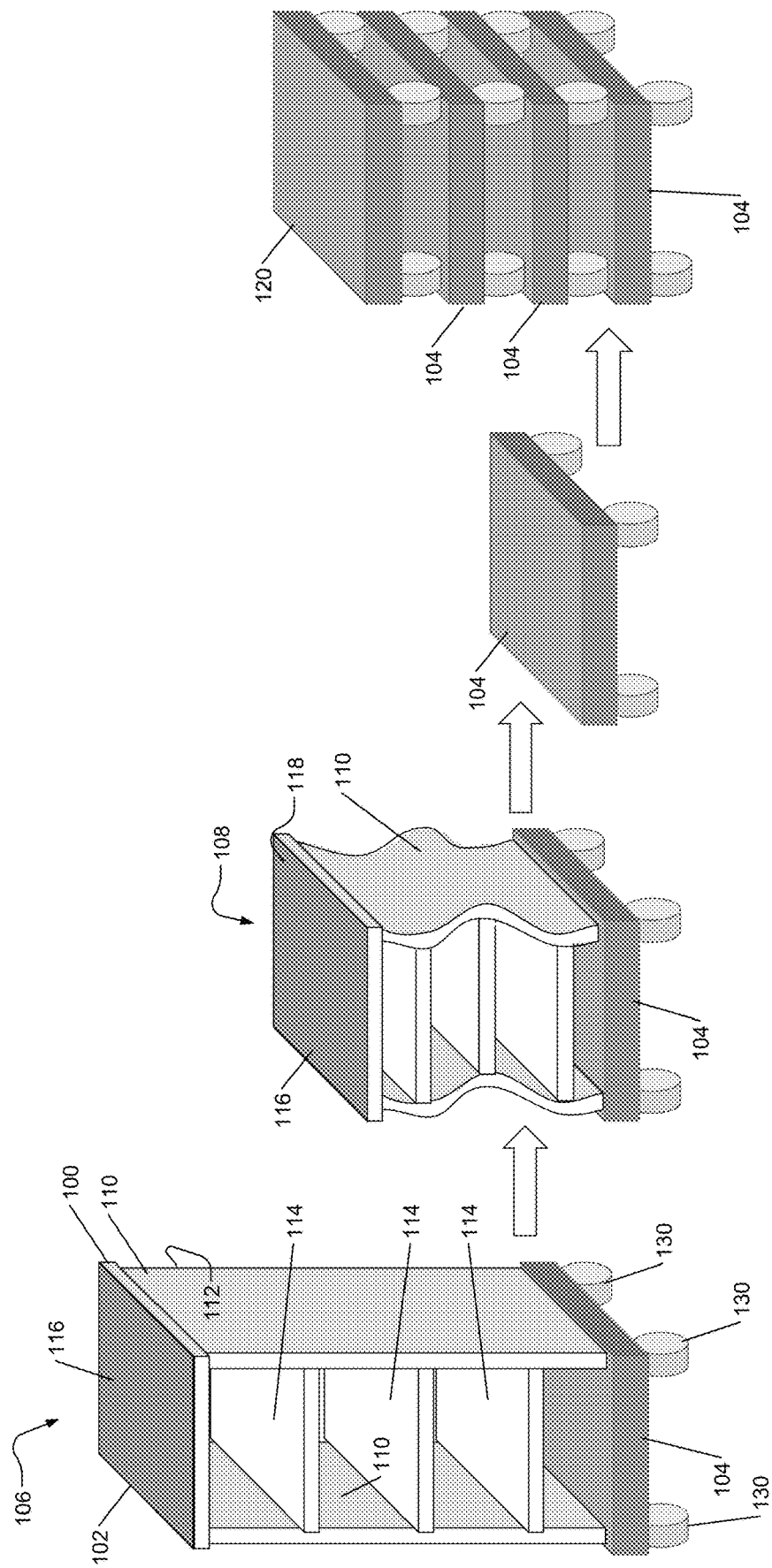
FIG. 1 is a perspective view of portions of example inflatable delivery cabinets shown in different inflated, partially deflated and stowable stacked states in accordance with the present disclosure.

FIG. 1 shows a portion 100 of an example inflatable delivery cabinet, which includes an inflatable cabinet stand 102 and a base 104. The cabinet stand 102 is shown in a fully inflated state 106 and a partially inflated state 108.

Figure 6:
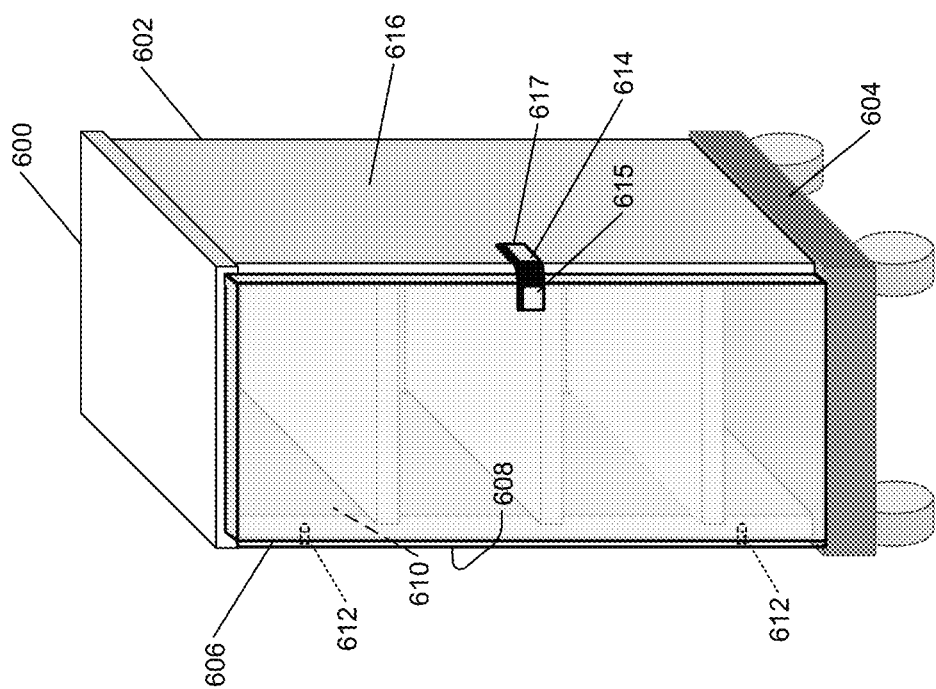
FIG. 6 is a perspective view of another example inflatable delivery cabinet including an inflatable door in accordance with the present disclosure.
Figure 5:
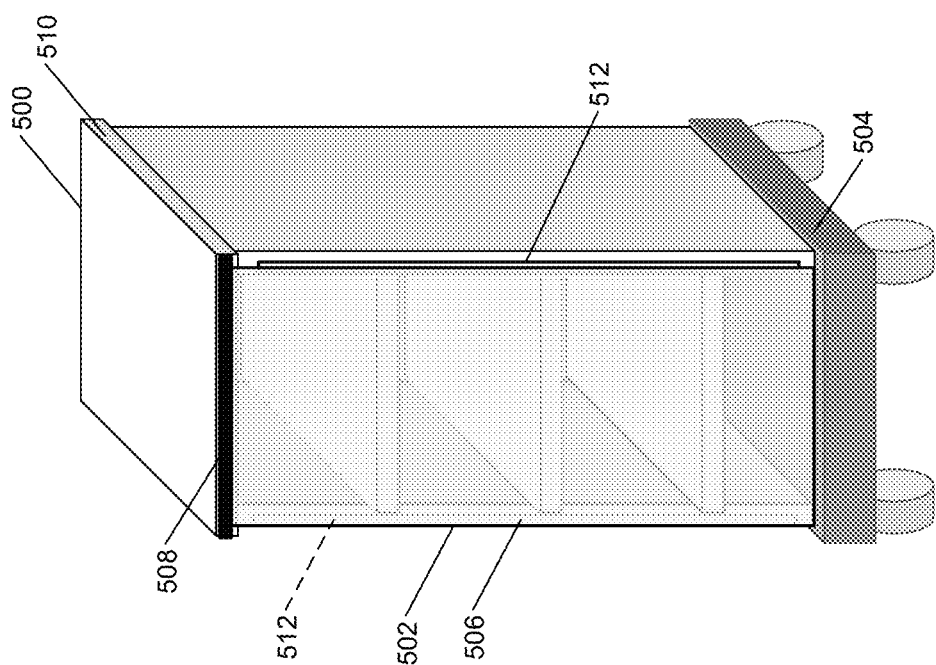
FIG. 5 is a perspective view of another example inflatable delivery cabinet including a flexible door in accordance with the present disclosure.

The cabinet stand 102 includes two side walls 110, a back wall 112, shelves 114, and a top member 116. The cabinet stand 102 may include a door, examples of which are shown in FIGS. 5-6. In one embodiment, the side walls 110, back wall 112, shelves 114, and/or top member 116 may be inflatable. When inflated, the side walls 110, back wall 112, shelves 114, and/or top member 116 are semi-rigid or rigid, depending on the structure. When deflated, the side walls 110, back wall 112, shelves 114, and/or top member 116 are flexible to allow these members to collapse and be easily stacked and stowed. In another embodiment, the side walls 110 and the back wall 112 are inflatable and flexible and the top member 116 is rigid and not inflatable.

By having some or all of the stated members be deflatable and flexible, the volume of the cabinet stand 102 is able to be reduced. This allows the cabinet stand 102 to be stored in a small area, which aids, for example, when collecting and storing numerous cabinet stands. The side walls 110, back wall 112, shelves 114, top member 116, and/or door of the cabinet stand 102 when inflated, provide an insulated barrier for maintaining temperatures of products held within the cabinet stand 102.

In another embodiment, the top member 116 is partially inflatable and includes a rigid top plate layer 118. By having a rigid top plate layer or a rigid top member, the cabinet stand 102 is able to be stacked when in a fully deflated state with other inflatable cabinet stands. The cabinet stand 102 may include any number of shelves, which may be held on the side walls 110 using various techniques. In one embodiment, the top member 116 and/or the shelves 114 are integrally formed as part of the cabinet stand 102 to provide a single inflatable structure. Some example techniques are shown and described with respect to FIGS. 9-10.

Figure 4:
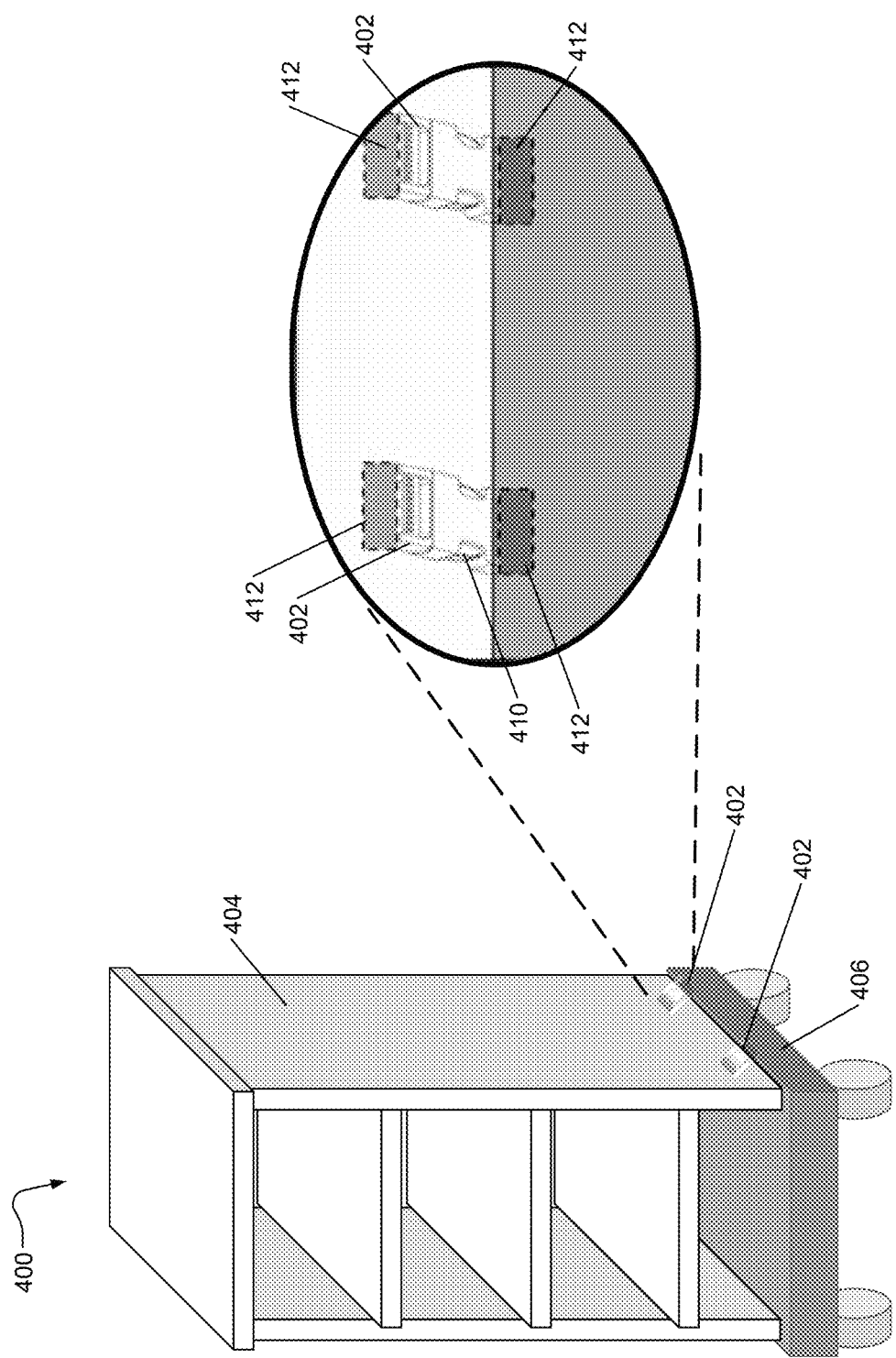
FIG. 4 is a perspective view of a portion of another example inflatable delivery cabinet including attachment elements for connecting an inflatable cabinet stand to a base in accordance with the present disclosure.

The cabinet stand 102 may be detached from the base 104. An example attachment implementation is shown in FIG. 4. After being detached, the base 104 may be stacked with other bases 120 as shown. Although not shown in FIG. 1, deflated cabinet stands may be stacked along with bases in a single stack. The base 104 may include rollers 130 for rolling the inflatable cabinet between different locations. The rollers 130 may have locks to prevent the rollers from moving when in the stowed state.

Figure 2:
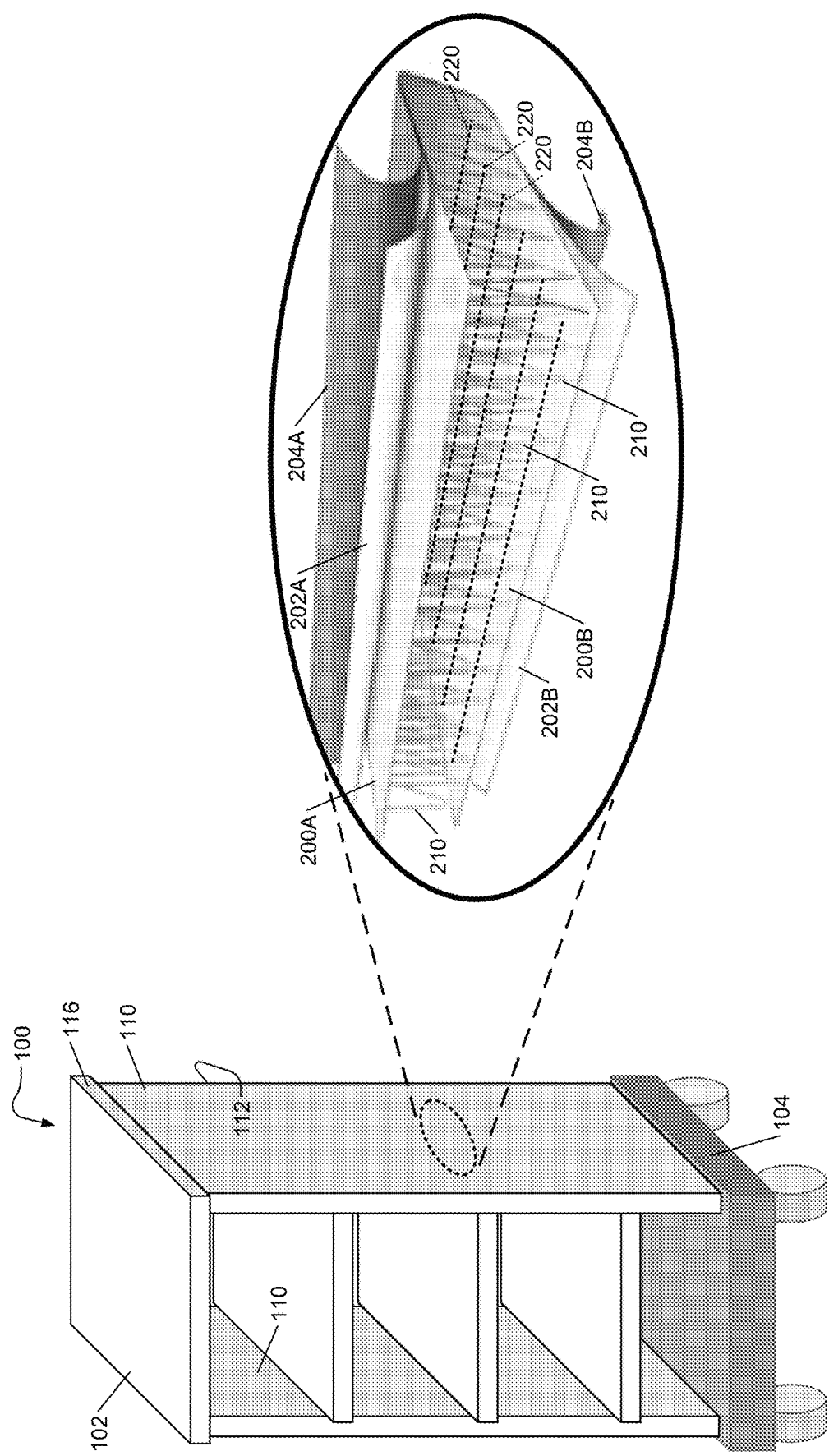
FIG. 2 is a perspective view of a portion of one of the inflatable delivery cabinets of FIG. 1 illustrating a perspective sectional view of a portion of a side wall in accordance with the present disclosure.

FIG. 2 shows the portion 100 of the inflatable delivery cabinet of FIG. 1, which includes the cabinet stand 102 and the base 104. The cabinet stand 102 includes the side walls 110, back wall 112, shelves 114, and top member 116. The side walls 110 and the back wall 112 may be tethered members having multiple layers. In one embodiment, the shelves 114 and/or the top member 116 are tethered members having multiple layers.

An example makeup of the tethered members is shown for one of the side walls 110 and includes: an encapsulating fabric layer 200 including a first layer 200A and a second layer 200B; an encapsulating bond layer 202 including a first layer 202A and a second layer 202B; and an encapsulating outer layer (or shell) 204 including a first layer 204A and a second layer 204B. The layers 200, 202, 204 form a stack that is air tight, waterproof and durable and, when inflated, rigid. The layers 200A and 200B are have textile surfaces that are tethered via strands 210. The strands 210 provide interconnections between the layers 200A, 200B. As an example, the strands 210 may be sewn, knitted, and/or weaved between the layers 200A and 200B. Each single strand may be, for example, weaved between the layers 200A and 200B hundreds of times. Any number of strands may be weaved in a zig-zag pattern and/or other suitable pattern between the layers 200A and 200B. The tethering of the layers 200A and 200B provides a rigid durable structure that resist local bulging and/or deformation. The tethering of the layers 200A, 200B may be performed using, for example, a 3-dimensional knitting machine.

The layers 204A, 204B may be formed of thermoplastic polyurethane (TPU), polyvinyl chloride (PVC), silicone, plastic and/or other air tight, waterproof, durable material. The layers 204A, 204B may be formed as a laminate over the other layers of the corresponding member. The layers 202A, 202B may include an adhesive material. The layers 200A, 200B may be formed of nylon, polyester, a heat-resistant and strong synthetic fiber (e.g., Kevlar®), and/or other suitable fabric. In one embodiment, the layers 202A, 202B are not included and the layers 204A and 204B are formed of a liquid silicone, which coats the exterior of the encapsulated layer 200 and cures to provide an air tight outer shell. The materials of the layers 200A, 200B, 202A, 202B, 204A, 204B may be based on the environmental conditions, life cycles, and performance requirements of the corresponding members of the cabinet stand being formed.

Figure 8:
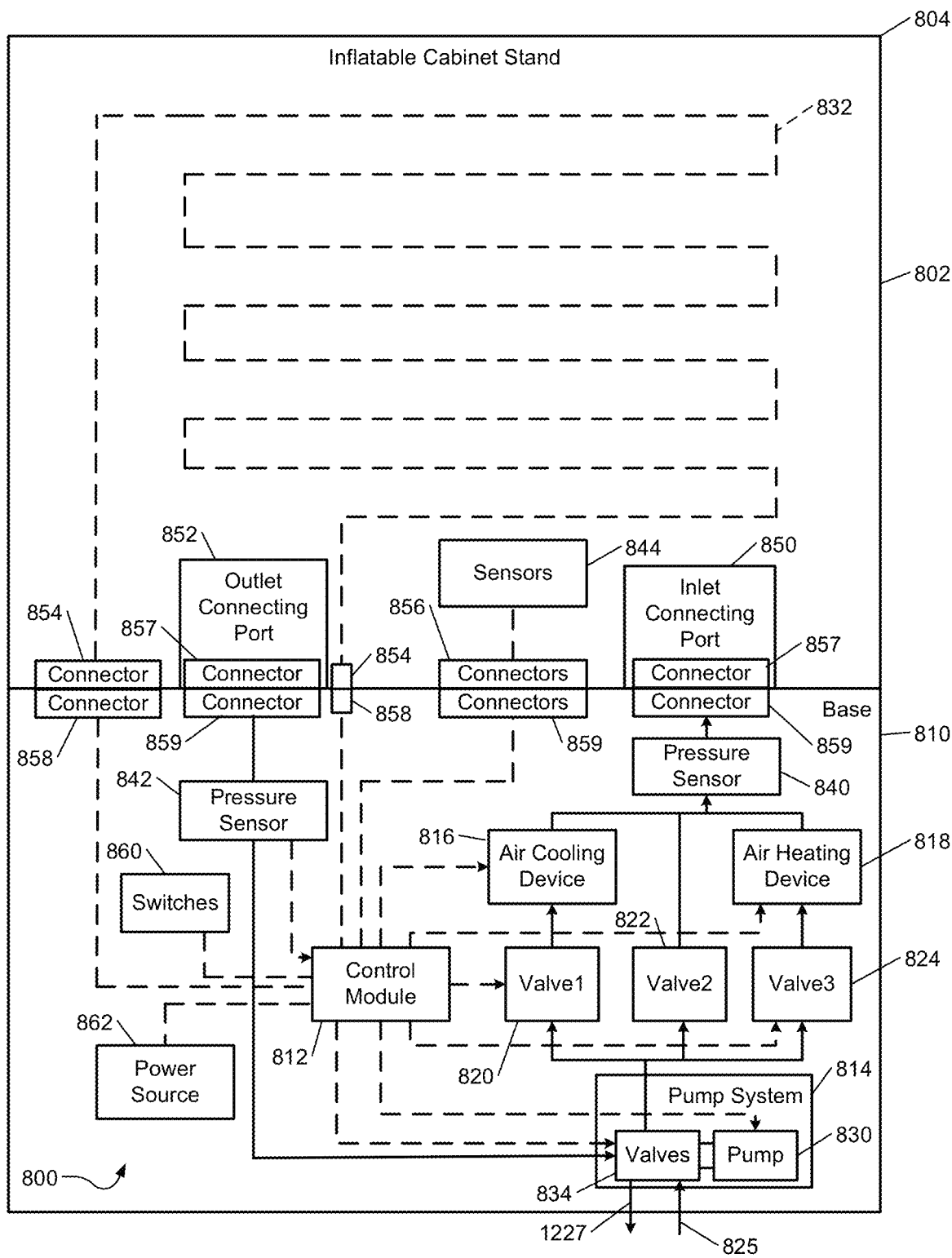
FIG. 8 is a functional block diagram of an example inflatable cabinet system in accordance with the present disclosure.

The side walls 110, back wall 112, shelves 114, and/or top member 116 may include embedded heating elements. As an example, heating elements 220 are shown. In one embodiment, the heating elements 220 are disposed between one or more adjacent pairs of the layers 200A, 204A and 200B, 204B. The heating elements may be disposed in the bonding layers 202A, 202B. As an example, the heating elements 220 may be applied to one or more of the layers 200A, 200B and a bonding material to form the layers 202A, 202B or an outer shell material to form the layers 204A, 204B may be applied over the heating elements 220 to encapsulate the heating elements 220 and the layers 200A, 200B. In one embodiment, the heating elements 220 are weaved or knitted as part of and/or while making the layers 200A, 200B. Although the heating elements 220 in FIG. 2 are show as separate elements, the heating elements 220 may be formed as a single electrode (or wire) that extends in a winding pattern across planar surfaces of the layers 200A, 200B. In an embodiment, the single electrode is inlayed between two adjacent ones of the layers 200A, 200B, 202A, 202B, 204A, 204B. Another heating element example is shown in FIG. 8. Each of the side walls 110, back wall 112, shelves 114, and/or top member 116 may include any number of heating elements that receive electrical current for heating the side walls 110, back wall 112, shelves 114, and/or top member 116 and as a result an interior of the inflatable cabinet.

Figure 3:
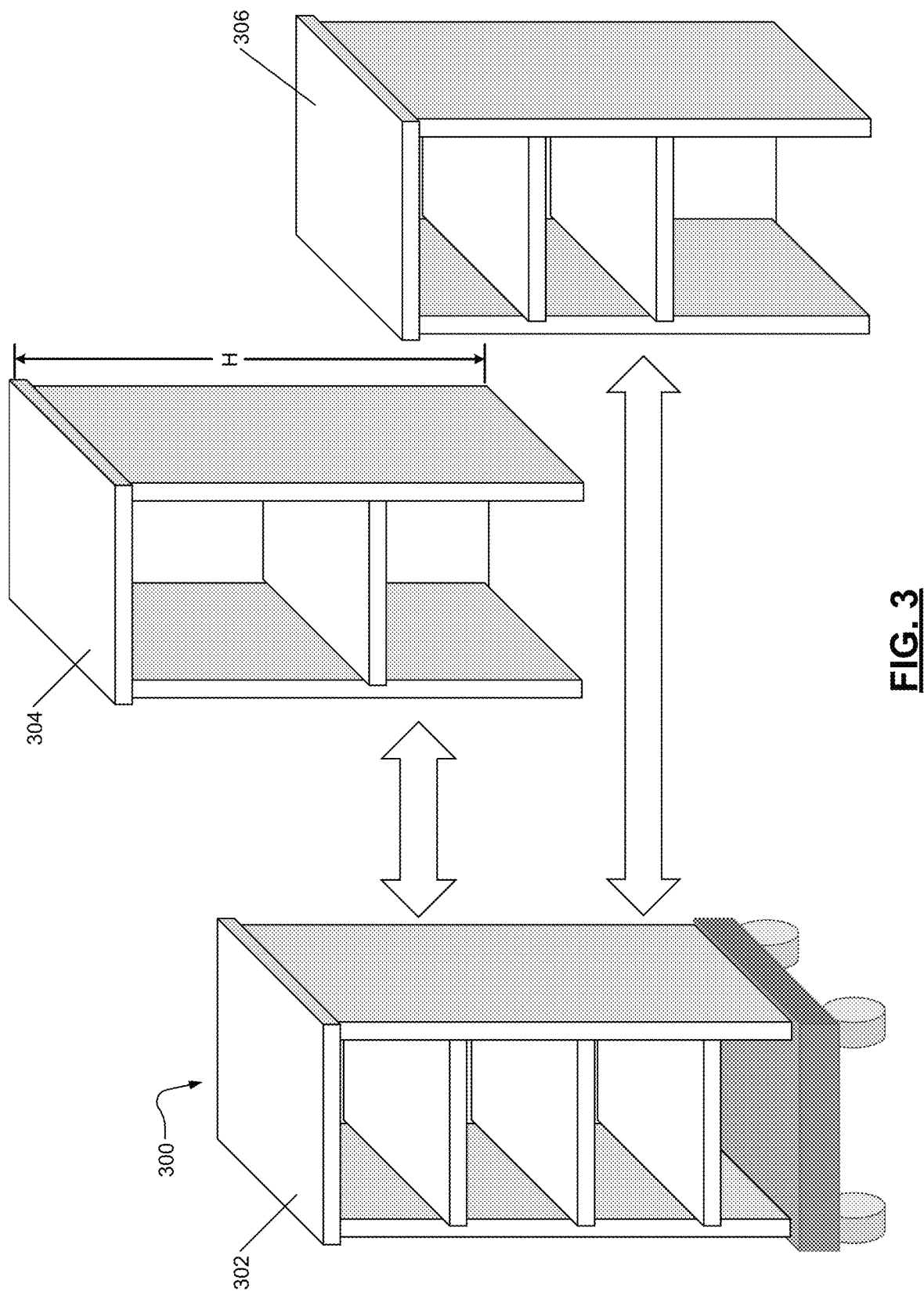
FIG. 3 is a perspective view of a portion of an inflatable delivery cabinet illustrating different interchangeable inflatable cabinet stands in accordance with the present disclosure.

FIG. 3 shows a portion 300 of an inflatable delivery cabinet having multiple interchangeable inflatable cabinet stands 302, 304, 306. The cabinet stands 302, 304, 306 may have different configurations. As an example, the cabinet stands 302, 304, 306 may be configured to hold a different number of shelves. In the example shown, the cabinet stands 302, 304, 306 include three shelves, a single shelve and two shelves, respectfully. In another embodiment, the cabinet stands 302, 304, 306 have different heights and/or different internal configurations. An example height H is shown for cabinet stand 304. In another embodiment, one or more of the cabinet stands 302, 304, 306 includes internal heating elements and the other one or more of the cabinet stands 302, 304, 306 does not include internal heating elements. In yet another embodiment, the cabinet stands 302, 304, 306 are formed of different materials for different applications of use.

FIG. 4 shows a portion 400 of an inflatable delivery cabinet including attachment elements 402 for connecting a cabinet stand 404 to a base 406. The attachment elements 402 are provided as examples only. Various other types of attachment elements may be implemented. As a few examples, the cabinet stand 404 include snaps, zippers, slides, guides, pins, clips, hook and loop fasteners (e.g., Velcro® fasteners) and/or other attachment elements for attaching the cabinet stand 404 to the base 406. In the example shown, the attachment elements 402 include buckles 410 with corresponding attaching straps 412.

FIG. 5 shows an inflatable delivery cabinet 500 that includes a cabinet stand 502, a base 504 and a flexible door 506. The cabinet stand 502 may be configured as any of the cabinet stands disclosed herein. The cabinet stand 502 may include an upper attachment member 508 for hanging the flexible door 506. The attachment member 508 is attached to a top member 510 of the cabinet stand 502. The flexible door 506 may be rolled up and/or folded over the top member 508 when accessing the interior of the cabinet stand 502. As an example, closing straps 512 may be attached to front faces of the cabinet stand 502. The closing straps 512 may be tacky as to stick to and/or hold the flexible door 506 in a closed state. In another embodiment, the closing straps 512 may include hook or loop fasteners and similar opposing straps may be attached to the inside of the flexible door to hold the flexible door 506 in a closed state.

FIG. 6 shows an inflatable delivery cabinet 600 that includes a cabinet stand 602, a base 604 and an inflatable door 606. The inflatable door 606 may be connected along a side (e.g., left side 608) to the cabinet stand 602. Air may be passed between a side wall 610 of the cabinet stand 602 and the door 606 via channels 612 extending between the side wall 610 and the door 606. The inflatable door 606 may have a similar multi-layer tethered structure as shown in FIG. 2. The door 606 may be held in a closed state via a clasp 614 having a first portion 615 attached to the door 606 and a second portion 617 attached to side wall 616 of the cabinet stand 602. As an example, the portions 615, 617 may be magnetic and attract each other. In one embodiment, the portions 615, 617 include a hook and receiver style latch.

Figure 7:
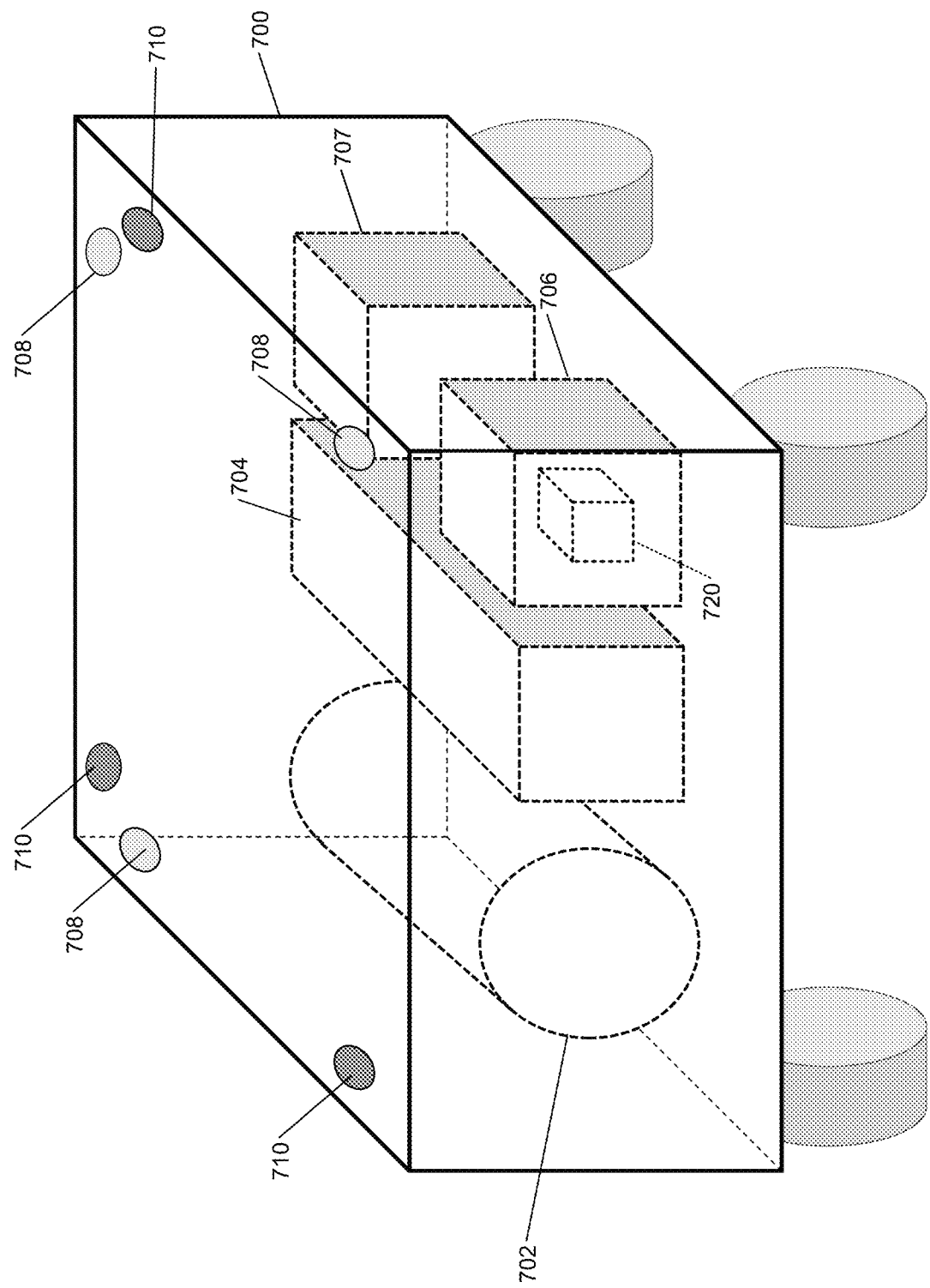
FIG. 7 is a perspective view of a base of an example inflatable delivery cabinet in accordance with the present disclosure.

FIG. 7 shows a base 700 of an example inflatable delivery cabinet. The base may be a stand-along base that is portable as shown or may be integrated into a floor, such as a floor of a delivery truck or a floor of a warehouse, and be non-portable and in a fixed location. Any of the bases referred to herein may be configured similarly as the base 700. The base 700 may include an air compressor 702, a cooling system 704, a heating system 706, and a power source 707. The cooling system 704 and the heating system 706 may be connected to inlet air connectors 708 and outlet air connectors 710, which are used to supply air to and receive air from an inflatable cabinet stand, such as any one of the cabinet stands disclosed herein. The connectors 708, 710 may include seals for preventing air leaks. The connectors 708, 710 may include one-way valves to allow air to flow in a certain direction and not in an opposite direction. Air lines connecting the cooling system 704 and the heating system 706 to the connectors 708, 710 are not shown in FIG. 7 for simplicity of illustration, but are at least partially represented by air lines in FIG. 8. The air compressor 702 may be included in the cooling system 704 and be used to compress air for the cooling system 704.

The air compressor 702 may compress air for the cooling system 704, which may cool air prior to being supplied to the cabinet stand. The cooling system 704 may be referred to as a cooling unit and operate similarly as an air conditioner and cool received outside air and/or air received from the cabinet stand. The heating system 706 heats received outside air and/or air received from the cabinet stand. The heating system 706 may include a heater 720 and/or other heating system components. The power source 707 may include a rechargeable battery pack, which is used to power the air compressor 702, the cooling system 704, the heating system 706 and/or other components and devices of the base 700, such as the devices and components shown in FIG. 8, which may be included in the base 700.

FIG. 8 shows an example inflatable cabinet system 800 for an inflatable cabinet stand 802 of an inflatable cabinet 804. The inflatable cabinet 804 includes a base 810 that includes a control module 812, a pump system 814, an air cooling device 816, an air heating device 818, and valves 820, 822, 824. The control module 812 controls operation of the pump system 814, the air cooling device 816, the air heating device 818, and the valves 820, 822, 824 to control whether: air is being supplied to inflate the cabinet stand 802; air is being drawn from and to deflate the cabinet stand 802; air is being cooled prior to being supplied to the cabinet stand 802; air is being heated prior to being supplied to the cabinet stand; and/or air at ambient temperature is being supplied to the cabinet stand 802. Air received from outside the base 810 is represented by arrow 825.

The control module 812 controls: activation and deactivation of a pump 830 of the pump system 814; activation and deactivation of the air cooling device 816, activation and deactivation of the air heating device 818, activation and deactivation of heating elements (e.g., the heating element 832) of the cabinet stand 802; and opening and closing and positions of the valves 820, 822, 824 and valves 834 of the pump system 814. This control may be based on signals from sensors, such as air pressure sensors 840, 842 and/or sensors 844 in the cabinet stand 802. The air pressure sensors 840, 842 may indicate pressure of air entering the cabinet stand 802 and pressure of air exiting the cabinet stand 802. The sensors 844 may indicate temperature and/or pressure of air in members (e.g., side walls, back wall, shelves, top member, and/or door) of the cabinet stand 802. The sensors 844 may also indicate temperatures within the interior of the cabinet stand 802, where products are stored. The control module 812 may receive power from a power source 862 and provide power to the air cooling device 816, the air heating device 818, the pump 830, and the heating element 832.

The cabinet stand 802 includes inlet connecting ports (one is shown and designated 850), outlet connecting ports (one is shown and designated 852), and may include connectors 854, 856. The connecting ports may include connectors 857, which may be connected to connectors 859 of the base 810. The connector(s) 854 are connected to heating elements (e.g., heating element 832) and connector(s) 856 connected to sensors 844. The connectors 854, 856 may be connected to connectors 858, 859 in the base 810.

The valve 820 controls flow of air to and/or through the air cooling device 816. The valve 822 controls flow of ambient temperature air directly to the cabinet stand 802. The valve 824 controls flow of air to and/or through the air heating device 818. Air supplied from the air cooling device 816, the pump system 814 and/or the air heating device 818 is supplied to the inlet connecting port(s) 850. Although shown separate from the pump system 814, the valves 820, 822, 824 may be included as part of the pump system 814. The valves 834 may control whether outside air is being supplied to the cabinet stand 802 and/or whether air from the cabinet stand 802 is output from the base to an area external to the base 810.

The base 810 may include switches 860 and/or other input devices. A first one of the switches 860 may be used to signal the control module 812 to inflate or deflate the cabinet stand 802. In one embodiment, the switches 860 may be toggled by a user. In another embodiment, the first one of the switches 860 is toggled when the cabinet stand 802 is connected to the base 810. A second one of the switches 860 may be used to select an operating mode; a cooling mode, a heating mode or an ambient temperature mode. The cooling mode is associated with cooling air supplied to the cabinet stand 802. The heating mode is associated with heating air supplied to the cabinet stand 802. The ambient temperature mode is associated with supplying air outside the base 810 at ambient temperature to the cabinet stand 802.

The control module 812, in addition to controlling the pressure in the members of the cabinet stand 802, also controls the temperatures in the members and in an interior of the cabinet stand 802 where products are stored. The products may refer to, for example, food and/or other products. The control and operation of the stated devices of the base 810 are further described below with respect to the method of FIG. 12. This method is provided as an example, some or all of the method may be implemented and/or modified for the application of use.

Figure 9:
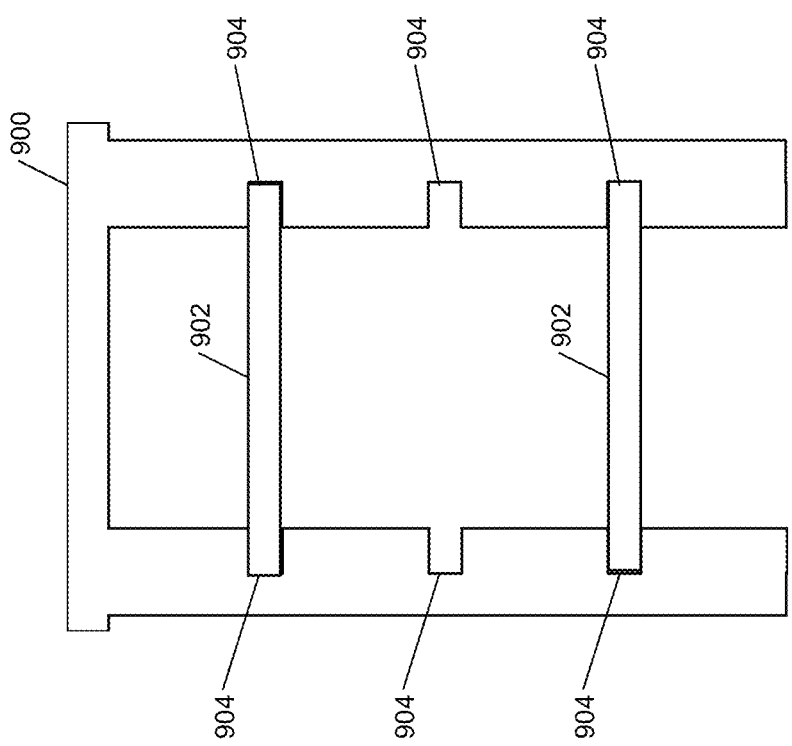
FIG. 9 is a side view of a portion of an example cabinet stand of an inflatable delivery cabinet including reconfigurable sliding shelves in accordance with the present disclosure.

FIG. 9 shows a portion 900 of an example cabinet stand of an inflatable delivery cabinet including reconfigurable sliding shelves 902. The portion 900 may include 'U'-shaped channels 904 for the shelves 902 to be slide into. The shelves 902 may be rigid and not inflatable. In one embodiment, each of the shelves 902 is individually inflatable and includes an inlet/outlet valve. The shelves 902 may have a multi-layer tethered structure similar to that shown in FIG. 2.

Figure 10:
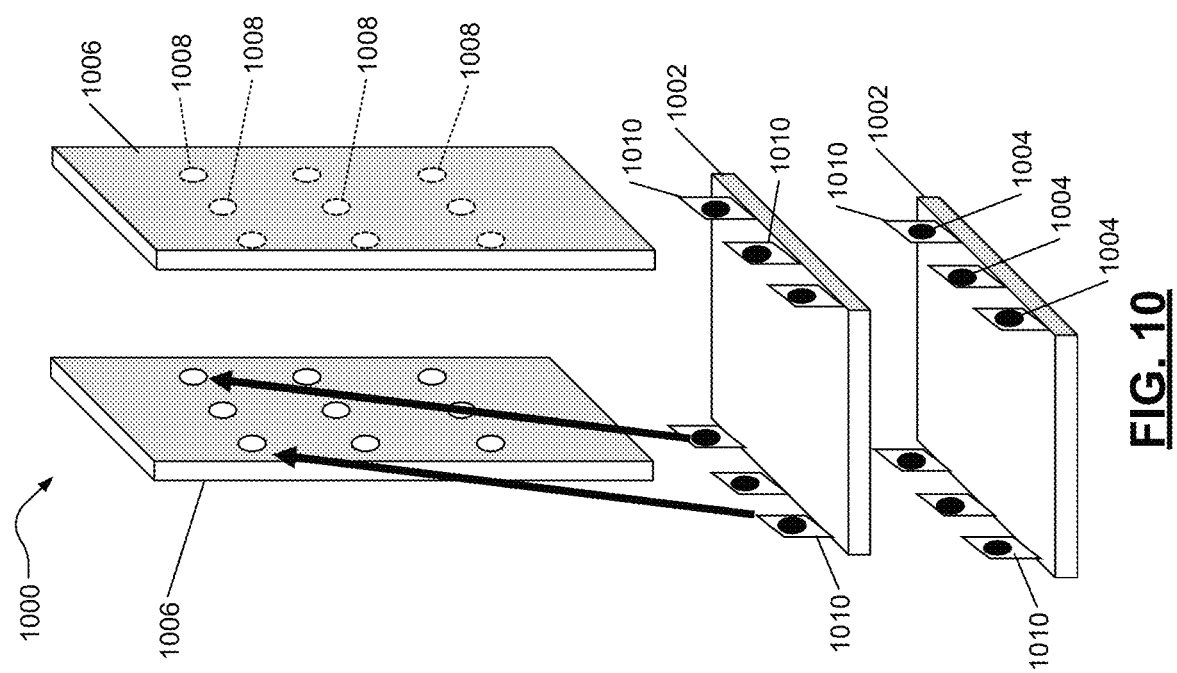
FIG. 10 is a perspective view of a portion of an example cabinet stand including reconfigurable hanging shelves in accordance with the present disclosure.

FIG. 10 shows a portion 1000 of an example cabinet stand including reconfigurable hanging shelves 1002. The shelves 1002 include first connecting elements 1004 and side walls 1006 include second connecting elements 1008. The first connecting elements 1004 are attached to hanging elements 1010, which are attached to the shelves 1002. As an example, the connecting elements 1004, 1008 are snap on buttons (or snaps) with corresponding parts that snap together.

Figure 11:
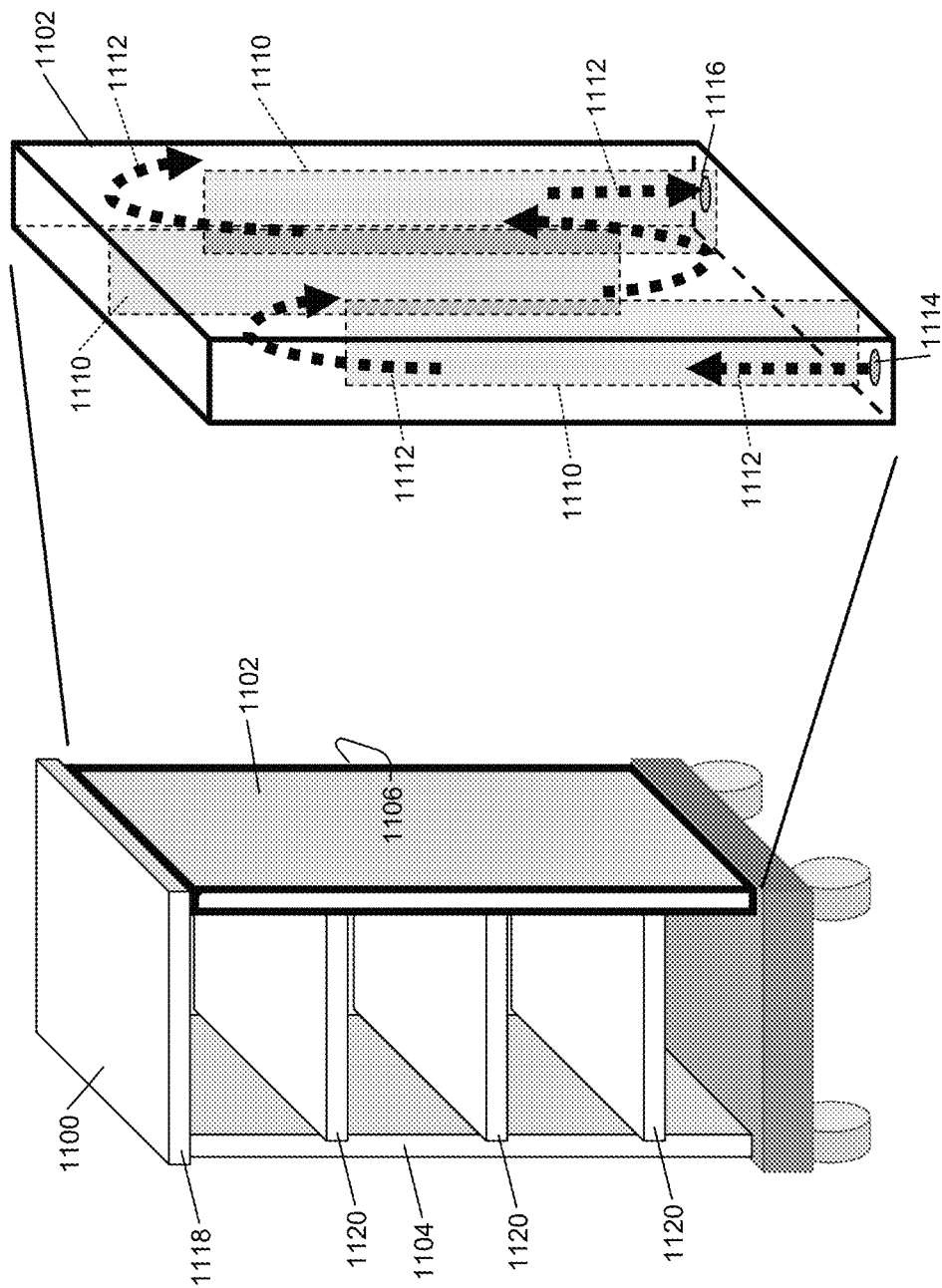
FIG. 11 is a perspective view of an example inflatable delivery cabinet illustrating internal side wall structure and air flow in accordance with the present disclosure.

FIG. 11 shows an example inflatable delivery cabinet 1100 that includes side walls 1102, 1104 and a back wall 1106. The walls 1102, 1104, 1106 may include guide vanes to guide the flow of air across and through the walls 1102, 1104, 1106. An example, internal structure of the side wall 1102 is shown and includes guide vanes 1110. Air flow is indicated by arrow 1112. The air is passed from an inlet port 1114 to an outlet port 1116. The ports 1114, 1116 may include connectors for connecting to air channels of a base, such as any of the bases disclosed herein. In one embodiment, the ports 1114, 1116 include manual connectors and/or valves for manual supply of air and/or venting of air. The top member 1118, shelves 1120 and/or a door of the inflatable cabinet may also include guide vanes. The walls and members with guide vanes operate as a chilled air channels when cooled air is supplied to and guided through the walls and/or members.

Figure 12A:
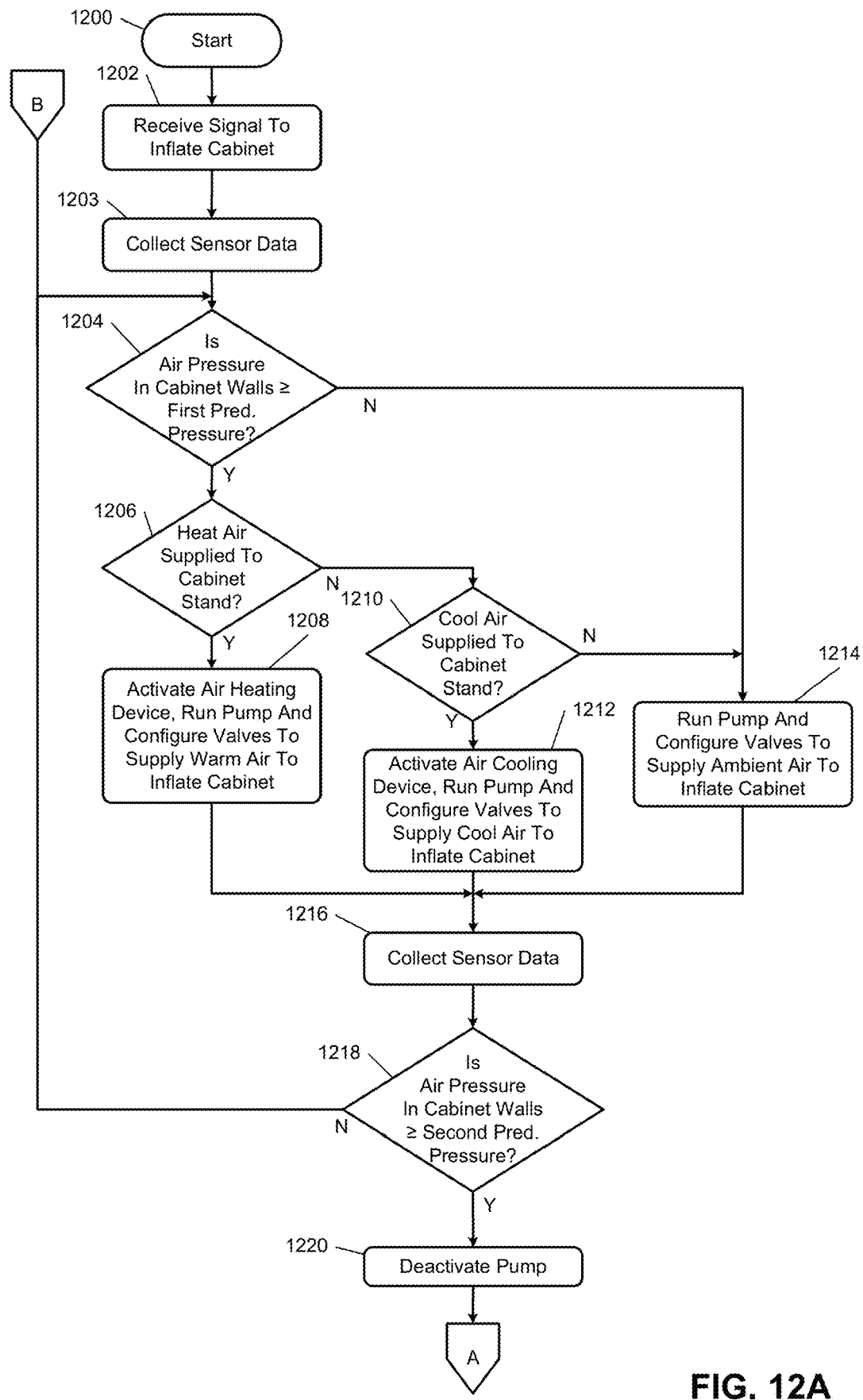
FIGS. 12A and 12B (collectively FIG. 12) illustrate a method of operating an inflatable cabinet system in accordance with the present disclosure.
Figure 12B:
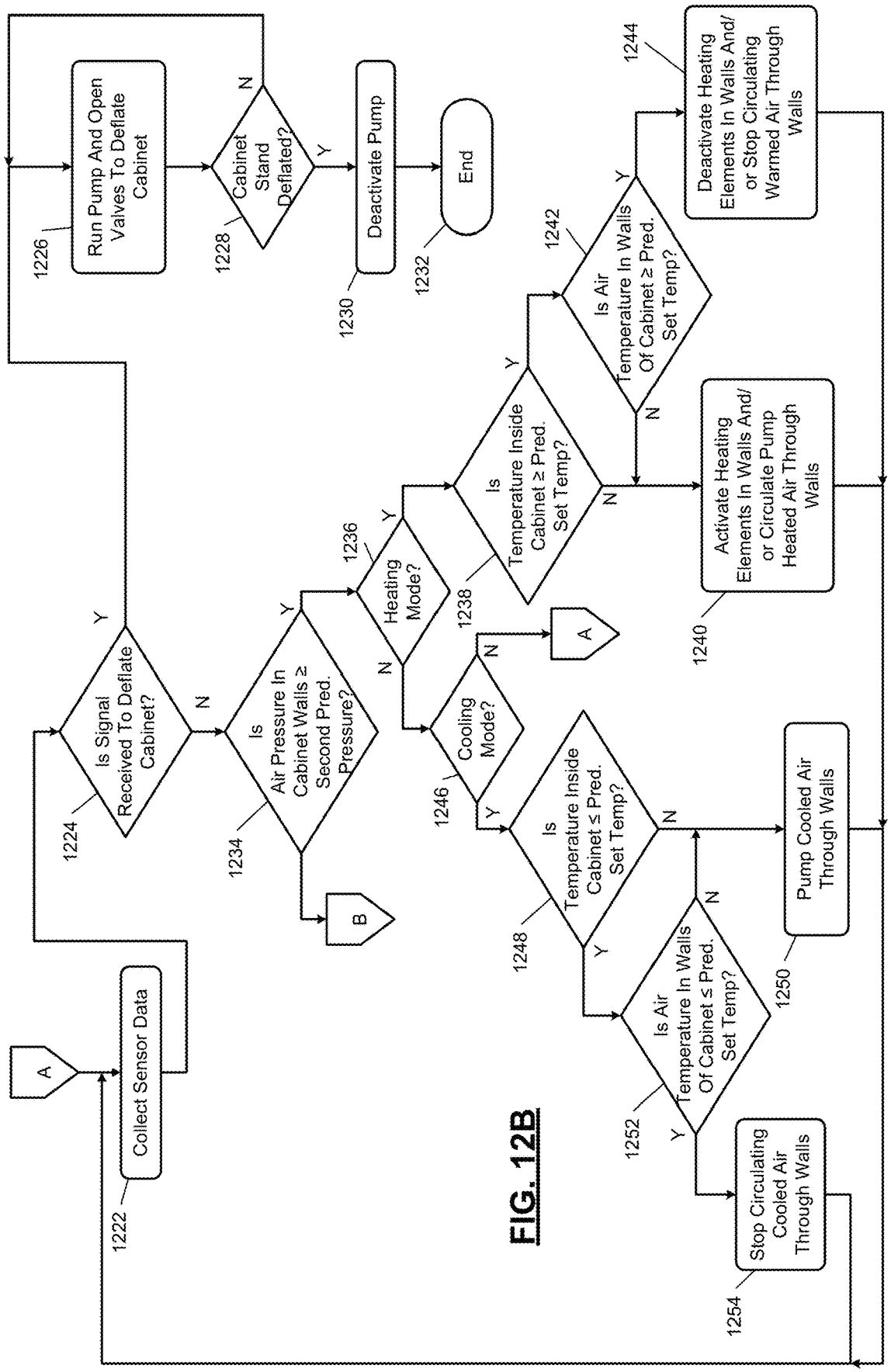

FIG. 12 shows a method of operating an inflatable cabinet system. Although the following operations are primarily described with respect to the implementations of FIGS. 7-8, the operations may be easily modified to apply to other implementations of the present disclosure. The operations may be iteratively performed. The operations may be performed by the control module 812. The method may begin at 1200. At 1202, the control module 812 receives a signal and/or an indication to inflate the cabinet stand 802. This may be as a result of the switch 860 on the base 810 being switched and/or toggled.

At 1203, the control module 812 collects signals and/or data from the sensors 840, 842, 844 to determine air pressures.

At 1204, the control module 812 may determine whether the air pressure in walls of the cabinet stand 802 is greater than or equal to a first predetermined pressure and/or the pump has run for a first predetermined period of time. The air pressure may be determined based on signals from one or more of the pressure sensors 840, 842 and/or one or more of the pressure sensors included in sensors 844. The first predetermined pressure being greater than zero and appropriate for permitting activation of air flow. If yes, operation 1206 is performed, otherwise operation 1214 is performed.

At 1206, the control module 812 determines whether to heat air supplied to the cabinet stand 802. The air may be heated when operating in the heating mode and when the air pressure is greater than or equal to the first predetermined pressure. If yes, operation 1208 is performed, otherwise operation 1210 is performed.

At 1208, the control module 812 activates the air heating device 818, deactivates the air cooling device 816, runs the pump 830 and configures the valves 820, 822, 824 and 834 including opening the valve 820 and closing the valves 822, 824.

At 1210, the control module 812 determines whether to cool air supplied to the cabinet stand 802. The air may be cooled when operating in the cooling mode and when the air pressure is greater than or equal to the first predetermined pressure. If yes, operation 1212 is performed, otherwise operation 1214 is performed.

At 1212, the control module 812 activates the air cooling device 816, deactivates the air heating device 818, runs the pump 830 and configures the valves 820, 822, 824 and 834 including opening the valve 822 and closing the valves 820, 824.

At 1214, the control module 812 operates in the ambient temperature mode and deactivates the devices 816, 818, runs the pump 830 and configures the valves 820, 822, 824 and 834 including opening the valve 824 and closing the valves 820, 822.

At 1216, the control module 812 collects signals and/or data from the sensors 840, 842, 844 to determine air pressures and/or temperatures.

At 1218, the control module 812 determines whether the air pressure in the walls is greater than or equal to a second predetermine pressure and/or the pump has run for a second predetermined period of time. The air pressure may be determined based on signals from one or more of the pressure sensors 840, 842 and/or one or more of the pressure sensors included in sensors 844. The second predetermined pressure may be greater than the first predetermined pressure. If yes, operation 1220 is performed, otherwise operation 1204 is performed.

At 1220, the control module 812 deactivates the pump 830.

At 1222, the control module 812 may collect signals and/or data from the sensors 840, 842, 844 to determine air pressures and/or temperatures.

At 1224, the control module 812 determines whether a signal and/or indication has been received to deflate the cabinet stand 802, such as from one of the switches 860. If yes, operation 1226 is performed, otherwise operation 1234 is performed.

At 1226, the control module 812 runs the pump 830 and configures the valves 820, 822, 824, 834 to deflate the cabinet stand 802. This may include closing the valves 820, 822, 824 and opening one of the valves 834 to allow air to be pumped out of the cabinet stand 802 and output from the base 810, as indicated by arrow 1227 of FIG. 8.

At 1228, the control module 812 determines whether the cabinet stand is deflated. This may occur, for example, when the pump 830 has run for a third predetermined period of time and/or when the air pressure in the cabinet stand 802 is less than a predetermined pressure. If the cabinet stand 802 has been deflated, operation 1230 may be performed and the pump is deactivated. Subsequent to deactivating the pump, the method may end at 1232.

At 1234, the control module 812 determines whether the air pressure in the walls of the cabinet stand 802 is greater than or equal to the second predetermined pressure. If yes, operation 1236 is performed, otherwise operation 1204 may be performed.

At 1236, the control module 812 proceeds to operation 1238 if operating in the heating mode and if not proceeds to operation 1246.

At 1238, the control module 812 determines whether the temperature inside the cabinet stand 802 where products are located is greater than or equal to a first predetermined set temperature based on signals from sensors 844. If yes, operation 1242 is performed, otherwise operation 1240 is performed.

At 1240, the control module 812 activates heating elements (e.g., the heating element 832) and/or activates the pump 830 and the heating system 706 including activating the air heating device 818 and pumps heated air through the walls. The air heating device 818 of FIG. 8 may refer to or be similar to the heater 720 of FIG. 7 and be part of the air heating system 706.

At 1242, the control module 812 determines whether the temperature in the walls of the cabinet stand 802 is greater than or equal to the first predetermined set temperature based on signals from sensors 844. If yes, operation 1244 is performed, otherwise operation 1240 is performed.

At 1244, the control module 812 deactivates the heating elements, the pump 830 and the air heating system 706 and air heating device 818.

At 1246, the control module 812, if operating in the cooling mode, performs operation 1248. If not operating in the cooling mode, the control module 812 may return to operation 1222.

At 1248, the control module 812 determines whether the temperature inside the cabinet stand 802 where products are located is less than or equal to a second predetermined set temperature based on signals from sensors 844. If yes, operation 1252 is performed, otherwise operation 1250 is performed.

At 1250, the control module 812 activates the cooling system 704 including activating the air cooling device 816 and pumps cooled air through the walls. The air cooling device 816 of FIG. 8 may be part of the air cooling system 704.

At 1252, the control module 812 determines whether the temperature in the walls of the cabinet stand 802 is less than or equal to the second predetermined set temperature based on signals from sensors 844. If yes, operation 1254 is performed, otherwise operation 1250 is performed.

At 1254, the control module 812 deactivates the pump 830 and the air cooling system 704 and air cooling device 816.

Operation 1222 may be performed subsequent to performing operations 1240, 1244, 1250, 1254.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The inflatable cabinets disclosed herein may be used as cooling chambers, heating or warming chambers, and/or storage chambers. The inflatable cabinets may be used in shipping vehicles, service vehicles, mobility vehicles, and other vehicles to transport various perishable and non-perishable goods. The inflatable cabinets may be used as a temporary shelving and/or storage system in a stationary warehouse and/or in a mobile warehouse.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An inflatable cabinet comprising:
 a first inflatable cabinet stand for storing products, wherein the first inflatable cabinet stand comprises
  a plurality of members including side walls; a back wall; and a top member, and
  first connectors; and
 a base connected to the first inflatable cabinet stand and comprising
  an air pump configured to pump air into at least one of the plurality of members of the first inflatable cabinet stand,
  second connectors configured to connect to the first connectors, and
  air lines connected between the air pump and the second connectors,
 wherein the base is configured to support the first inflatable cabinet stand, serve as a bottom wall of the first inflatable cabinet stand such that the side walls of the first inflatable cabinet stand extend upward from the base, and encase the air pump, the air lines and at least a portion of each of the second connectors.

2. The inflatable cabinet of claim 1, wherein one or more of the plurality of members includes guide vanes for directing air flow across and through the one or more of the plurality of members.

3. The inflatable cabinet of claim 1, wherein one or more of the plurality of members has a multi-layer tethered structure.

4. The inflatable cabinet of claim 3, wherein the multi-layer tethered structure comprises:
 a plurality of fabric layers with weaved strands extending between the plurality of fabric layers; and
 an outer air tight shell encapsulating the plurality of fabric layers.

5. The inflatable cabinet of claim 4, further comprising a bond layer disposed between the plurality of fabric layers and the outer air tight shell.

6. The inflatable cabinet of claim 4, wherein the multi-layered tethered structure includes heating elements embedded between the plurality of fabric layers.

7. The inflatable cabinet of claim 1, wherein one or more of the plurality of members includes a heating element embedded in the one or more of the plurality of members.

8. The inflatable cabinet of claim 1, wherein the first inflatable cabinet stand is interchangeable with a second inflatable cabinet stand and has a different configuration than the second inflatable cabinet stand.

9. The inflatable cabinet of claim 7, wherein:
 the first inflatable cabinet stand has a first overall height and a first total number of shelves: and
 the second inflatable cabinet stand at least one of has
  a second total number of shelves that is different than the first total number of shelves; or
  a second overall height that is different than the first overall height.

10. The inflatable cabinet of claim 1, wherein:
 the first inflatable cabinet stand includes attachment elements for attaching the first inflatable cabinet stand to the base; and
 the first inflatable cabinet stand is removable from the base and deflatable and stackable with other deflated cabinet stands.

11. The inflatable cabinet of claim 1, wherein the first inflatable cabinet stand has shelves that are able to be attached to the side walls in different locations.

12. The inflatable cabinet of claim 1, wherein the first inflatable cabinet stand comprises a flexible door.

13. The inflatable cabinet of Maim 1, wherein:
 the base comprises a control module; and
 the control module is configured to control flow and temperature of air supplied to the at least one of the plurality of members.

14. The inflatable cabinet of claim 13, further comprising a sensor configured to detect a temperature in the at least one of the plurality of members,
 wherein the control module is configured to control flow and temperature of air supplied to the at least one of the plurality of members based on the temperature detected by the sensor.

15. The inflatable cabinet of claim 13, further comprising a sensor configured to detect a pressure of air in the at least one of the plurality of members,
 wherein the control module is configured to control flow of air supplied to the at least one of the plurality of members based on the pressure detected by the sensor.

16. The inflatable cabinet of claim 1, wherein one or more of the plurality of members of the first inflatable cabinet stand comprises guide vanes directing air flow in a sinusoidal pattern across and through the one or more of the plurality of members from an inlet to an outlet, the inlet and outlet being on a same bottom edge of the one or more of the plurality of members and receiving air from directing air to the base.

17. An inflatable cabinet comprising:
 a first inflatable cabinet stand for storing products, wherein the first inflatable cabinet stand comprises
  a plurality of members including side walls, a back wall, and a top member,
  first connectors connected to the side walls, and
  the first inflatable cabinet stand comprises a plurality of shelves that are at least one of) inflatable, and ii) comprise heating elements; and a base connected to the first inflatable cabinet stand and comprising
   an air pump configured to pump air into at least one of the plurality of members of the first inflatable cabinet stand,
   second connectors connected to sides or a top surface of the base and configured to be removably connected to the first connectors, and
   air lines connected between the air pump and the second connectors.

18. The inflatable cabinet of claim 17, wherein the plurality of shelves are inflatable and comprise the heating elements.

19. An inflatable cabinet comprising:
a first inflatable cabinet stand for storing products, wherein the first inflatable cabinet stand comprises
   a plurality of members including side walls, a back wall, and a top member, and
   first connectors; and
a base connected to the first inflatable cabinet stand and comprising
   an air pump configured to pump air into at least one of the plurality of members of the first inflatable cabinet stand,
   second connectors configured to be removably connected to the first connectors, and
   air lines connected between the air pump and the second connectors, wherein
   the first inflatable cabinet stand is interchangeable with a second inflatable cabinet stand and has a different configuration than the second inflatable cabinet stand,
   the second inflatable cabinet stand comprising third connectors,
   the first inflatable cabinet stand and the second inflatable cabinet stand are configured to separately attach to the base via the second connectors by i) disconnecting the first connectors from the second connectors and removing the first inflatable cabinet stand from being disposed on the base, and ii) setting the second inflatable cabinet stand on the base and connecting the third connectors to the second connectors, and
   the base is configured to control i) temperatures of the first inflatable cabinet stand when attached to the first inflatable cabinet stand, and ii) temperatures of the second inflatable cabinet stand when attached to the second inflatable cabinet.

20. The inflatable cabinet of claim 19, wherein;
the first connectors are connected to the side walls of the first inflatable cabinet stand;
the second connectors are connected to sides or a top surface of the base; and
the third connectors are connected to side walls of the second inflatable cabinet stand.

* * * * *